United States Patent [19]

Wagner

[11] Patent Number: 4,634,484

[45] Date of Patent: Jan. 6, 1987

[54] METHOD FOR THE PRODUCTION OF AN EMBOSSING ROLLER FOR THE CONTINUOUS EMBOSSING OF THE SURFACE OF A THERMOPLASTIC FILM

[75] Inventor: Werner Wagner, Bad Nenndorf, Fed. Rep. of Germany

[73] Assignee: J.H. Benecke GmbH, Fed. Rep. of Germany

[21] Appl. No.: 702,490

[22] Filed: Feb. 19, 1985

[30] Foreign Application Priority Data

Feb. 20, 1984 [DE] Fed. Rep. of Germany ... 8405040[U]
Jan. 24, 1985 [DE] Fed. Rep. of Germany ....... 3502244

[51] Int. Cl.⁴ ..................... B29C 33/40; B29C 67/00; B28B 11/18
[52] U.S. Cl. ..................................... 156/219; 156/221; 264/162; 264/219; 264/224; 264/225; 264/227
[58] Field of Search ............... 264/227, 224, 225, 226, 264/220, 219, 284, 161, 162; 156/209, 219, 220, 229, 245, 246, 249, 247, 221, 267

[56] References Cited

U.S. PATENT DOCUMENTS

| | | | |
|---|---|---|---|
| 2,342,556 | 2/1944 | Rockoff | 264/219 |
| 3,081,495 | 3/1963 | Kovatch | 264/220 |
| 3,683,565 | 8/1972 | Greinev et al. | 264/162 |
| 3,914,369 | 10/1975 | Modic et al. | 264/225 |
| 3,998,681 | 12/1976 | Williams et al. | 264/162 |
| 4,250,135 | 2/1981 | Orsini | 264/227 |
| 4,283,240 | 8/1981 | Speer | 264/225 |
| 4,551,297 | 11/1985 | Bötcher et al. | 264/227 |

*Primary Examiner*—David Simmons
*Assistant Examiner*—Louis Falasco
*Attorney, Agent, or Firm*—Allegretti, Newitt, Witcoff & McAndrews, Ltd.

[57] ABSTRACT

Leather sheets having desired grain pattern are mounted on a roller with edges abutting. Onto the surface of the grain pattern a silicone synthetic resin is applied as a uniformly thick coating with a coating knife as the roller rotates. The resin is hardened into a matrix. It is then peeled off the grain pattern. The grain pattern in the matrix is interrupted where the leather sheets abutted. The matrix is placed with the pattern outward on a roller whose diameter pretty much matches the diameter of the embossing roller to be produced. The surface of a tubular thermoplastic film is embossed by contact with the cylindrical matrix under heat and pressure. The embossed surface of the thermoplastic film is once again overembossed under heat and pressure in the areas along the abutting edges of the natural grain pattern on the roller, so that an endless positive impression without seams in the grain's pattern is produced. Another layer of silicone rubber is applied to the positive impression, which layer is vulcanized into a matrix which is peeled off the positive form and adhered to the circumferential surface of the embossing roller with the negative side out. With this embossing roller a natural leather grain can be embossed on a thermoplastic film without the appearance of discontinuities at the abutting edges.

4 Claims, No Drawings

METHOD FOR THE PRODUCTION OF AN EMBOSSING ROLLER FOR THE CONTINUOUS EMBOSSING OF THE SURFACE OF A THERMOPLASTIC FILM

The invention concerns a method for the production of an embossing roller for imparting a leather grain or other embossed design to a thermoplastic film.

A known device of the kind in question has an embossing roller whose embossing surface is provided artificially, e.g., through mechanical processing, with an embossing form. There is no problem with producing a seamless embossing form. Yet the thermoplastic film embossed with it has an artificial appearance.

It is the objective of the invention to provide a method with which an embossing roller can be produced in a simple manner for a device for the continuous embossing of the surface of a thermoplastic film that has a natural leather grain, textile or other design, without any discontinuities in the natural embossing structure.

A difficult problem arises in the use of a natural leather surface as a basic form, namely, that a leather surface is not available in a continuous form. Thus, basically only an embossing layer, referred to herein as an embossing matrix, e.g., in the form of a longitudinally stretched rectangle, can be produced. If the rectangle is formed into a tube, a discontinuity occurs at the abutting edges which is so noticeable that a continuous embossing of a thermoplastic film with such a tubular matrix is not possible.

The essence of the invention consists in overcoming this discontinuity problem and thereby making possible a continuous embossing of a thermoplastic film on a large scale without gaps in the surface design. The invention provides for placing the natural leather pattern, which, e.g., is square in shape, on a roller with the opposing edges abutting directly. This results in an endless natural grain which, however, lacks the continuity of the natural grain impression in the area of the abutting edges.

According to the invention, by application of liquid silicone rubber to a roller having a natural grain surface and subsequent vulcanization and removal, an embossing matrix is created. But the tubular (endless) matrix still lacks continuity in the area of the abutting edges of the natural grain pattern, so that it is suitable for the embossing of a similar tubular, endless thermoplastic film.

After embossing, this endless thermoplastic film still has the original discontinuity in its surface structure, but it has the advantage of endlessness and, in particular, is capable of being once again thermoplastically deformed, hence specially embossed. According to the invention, the thermoplastic positive form is overembossed by the negative form of the matrix in the area in which the discontinuity of the grain shows, so that the discontinuity of the grain disappears.

In this way, there results a positive impression which is endless in its extension, especially in the surface structure, and hence shows no discontinuity. This positive form therefore is suitable as a pouring or brushing base for the application of silicone rubber which after vulcanization and removal has the grain of the original grain pattern in negative form but without discontinuities in the grain. The vulcanized silicone rubber tube can be put onto the embossing roller with the grain on the outside for continuous embossing of a natural leather grain without discontinuities.

The application of silicone rubber is made both onto the natural grain pattern and onto the thermoplastic intermediate form when they are on rollers. The rollers can be steadily turned so that the application can be by coating knife. The vulcanization is also done with a heated rotating roller so that overall a highly uniform silicone rubber coating is achieved.

The embossing of the tubular thermoplastic film is advantageously done by passing the film through the bight between a pair of spaced rollers, and it is especially useful if the tubular thermoplastic film and/or the tubular matrix each closely embrace one roller of the pair. With the use of rollers, these operations can be carried out with great accuracy.

In principle, it is possible to apply not only, for example, a rectangular piece of a natural grain pattern to the roller as a pouring base for silicone rubber, but also several pieces in both the circumferential and axial direction. This produces, of course, several discontinuties, which, however, can be made to disappear by means of overembossing.

If it is a matter of discontinuities in axial direction, the overembossing in the bight or gap between the two rollers can be quite simply done by continuously increasing the embossing pressure at the beginning of the run of the area to be overembossed and gradually decreasing it at the end. If it is a matter of discontinuities that extend in circumferential direction, overembossing in the bight between two rollers is possible by having the rollers forming the bight be cambered, so that an embossing gap is formed whose width continually increases outward from a center minimum dimension. In this way, a linear band-shaped overembossing in the circumferential direction can be obtained.

Instead of a natural leather surface, of course, any other kind of surface structure can serve as a basis, e.g., a fabric, felt, a wood surface or the like.

EXAMPLE 1

For the production of an embossing roller for the continuous embossing of the surface of a thermoplastic film, first a pattern of natural leather, fabric or the like is so cut that there are two parallel edges. This piece of natural leather, with the grain out, is adhered to a roller in such a way that the two parallel edges abut tightly. Then, with the roller rotating, by means of a coating knife, silicone rubber is applied in a uniform layer to the surface of the roller, vulcanized into an embossing matrix and then peeled off.

The embossing matrix, with the negative grain outward, is drawn onto a roller which together with another roller forms an embossing gap or slit. A tube of thermoplastic film is mounted on the second roller. In the bight between the two rollers, the negative form of the embossing matrix is impressed into the surface of the thermoplastic film under heat and pressure and thus a positive form of the grain is created.

Up to this point, the discontinuity of the natural leather grain still appears in the area of the abutting edges of the natural grain pattern. In order to do away with this, the thermoplastic film is overembossed in the area of the discontinuity of its positive grain by the embossing matrix, and this with surface areas of the embossing matrix that contain no discontinuity. The overembossing is done by continuously increasing the embossing pressure as the discontinuity passes through the embossing gap and the continuously decreasing it.

While the positive impression of the grain of the thermoplastic film is on the rotating roller, silicone rubber is applied to it by means of a coating knife in a uniform layer which is then vulcanized, with the roller continuing to rotate in order to prevent unevenness in the coating thickness.

After the vulcanizing, the silicone rubber tube thus produced is pulled off and turned inside out so that now the natural grain pattern appears on the outer surface without discontinuities. This silicone tube is drawn onto a roller after its inner surface has been coated with an adhesion promoter and a silicone adhesive. After the adhesive coating has hardened, the roller can be used as an embossing roller in a device for the continuous embossing of a thermoplastic film.

EXAMPLE 2

The procedure is the same as in Example 1, but two rectangular pieces of natural leather with the grain out are mounted on the roller, with closely adjacent edges running in the circumferential direction. This way there results in the embossing matrix and hence also in the grain of the thermoplastic film discontinuities in the grain which extend to the circumferential direction.

To prevent these discontinuities, overembossing is done as in Example 1 between two rollers, but these rollers are cambered, with the circumferentially running discontinuity lines being carried through the narrowest part of the bight between the cambered rollers, so that the embossing is the strongest there, while away from there in the axial direction it continuously decreases.

I claim:

1. In a method for the production of a negative embossing roller for the continuous embossing of a thermoplastic film in which a synthetic resin is poured or spread as a uniformly thick coating onto a grain-patterned surface and then hardened into an embossing matrix which is then peeled off the grain pattern, the improvement comprising wrapping a generally-rectangular sheet of leather with the grain pattern out, and opposed edges of the sheet abutting, around a roller whose diameter corresponds esentially to the diameter of the embossing roller to be produced, so that the entire surface of the roller is covered, spreading liquid silicone rubber on the grain pattern, hardening the rubber while in contact with said grain pattern to form a tubular embossing matrix, having discontinuities in the grain design where said opposed edges abut, and continuous portions adjacent said abutting edges, embossing at elevated temperature between a pair of spaced rollers the surface of a tubular thermoplastic film mounted on one roller of said tubular embossing matrix mounted on the other roller of said pair, embossing again the surface of the thermoplastic film by contact with said continuous portions of the embossing roller in the areas along the abutting edges of the natural grain pattern on the roller, while gradually increasing the pressure as the rolls approach the bight and then decreasing the embossing pressure as said abutting edges pass through the bight of said spaced rollers, thus producing an endless positive impression without discontinuities in the grain pattern, spreading liquid silicone rubber onto the positive impression, hardening the rubber to provide a negative embossing matrix, peeling the matrix from the positive impression, and adhering the negative embossing matrix, embossed side out, onto the circumferential surface of the embossing roller.

2. Method of claim 1 in which the silicone rubber is spread on the natural grain pattern with a coating knife while rotating the roller continuously.

3. Method of claim 1 in which at least two leather sheets are mounted next to each other on the roller with said abutting edges running in a circumferential direction, at least one of the two spaced rollers is cambered, and the circumferentially-running abutting areas to be embossed are led through the narrowest part of the bight between the two rollers to effect the increase and decrease in embossing pressure.

4. The method of claim 1 in which the step of increasing and decreasing the embossing pressure is accomplished by moving the spaced rollers toward and away from each other.

* * * * *